United States Patent Office 2,893,911

Patented July 7, 1959

2,893,911

1,2-BIS(ALKYLSULFOXY)-1,2-DIHALOETHYLENES AND FUNGICIDAL COMPOSITIONS COMPRISING THEM

Maynard S. Raasch, Wilmington, Del., assignor to E. I. du Pont de Nemours and Company, Wilmington, Del., a corporation of Delaware No Drawing. Application September 12, 1957
Serial No. 683,469

14 Claims. (Cl. 167—22)

This invention relates to new sulfones and sulfoxides, to fungicidal compositions containing them and to their use in treating seeds, plants and soil.

This application is a continuation-in-part of my copending application United States application Serial No. 367,351 filed July 10, 1953, now abandoned.

The compounds of my invention are characterized by having two ethylenically bonded carbons to each of which is attached a halogen atom and a sulfoxy group having all its oxygen bound only to the one sulfur. The compounds of this invention have the general formula $$RSO_mC(X)=C(Y)SO_nR' \quad (1)$$

wherein R and R' are the same or different alkyl radicals, the indicated oxygen atoms are joined only to the indicated sulfur atoms, which sulfur atoms otherwise are attached only to carbon atoms, $m$ and $n$ are positive whole numbers not greater than 2, i.e., 1 or 2, and X and Y are the same or different halogens, i.e., fluorine, chlorine, bromine, or iodine. Disulfones and disulfoxides of the above general formula in which R and R' are alkyl radicals having from one to six carbon atoms are a preferred group of products of this invention since they possess marked biological activity.

The products of this invention can be made by various methods. One method which is very satisfactory consists in oxidizing 1,2-dihalovinylenedisulfides to the desired sulfoxide or sulfone. The oxidation can be carried out with oxidizing agents such as, for example, hydrogen peroxide, chromic acid, sodium hypochlorite, benzoyl peroxide, nitric acid and potassium permanganate. Thus, the dihalovinylenedisulfide in solution in a solvent such as acetic acid can be heated with aqueous hydrogen peroxide for several hours. By controlling the reaction conditions, for example, the proportions of oxidizing agent and the temperature and the time of oxidation, the disulfide can be oxidized to the disulfoxide, to a mixed sulfoxide sulfone, or to the disulfone. Specific conditions vary with the particular disulfide being oxidized.

The oxidation of the 1,2-dihalovinylenedisulfides with hydrogen peroxide is conveniently carried out in an inert solvent, e.g., acetic acid or acetone. The amount of hydrogen peroxide used should be at least that stoichiometrically equivalent to the degree of oxidation desired. However, an excess of hydrogen peroxide can be used, particularly when the disulfone is being made. The oxidation can be carried out at temperatures ranging from room temperature, i.e., 20° to 30° C., up to 100° C. In general, the higher temperatures are used when the disulfones are being prepared. The reaction time is not critical, although if the reaction is carried out for extremely short periods, there is a tendency for a mixture of products to be formed. A reaction time of one hour at 100° C. is satisfactory, although longer times of up to one day are not harmful. The oxidation with hydrogen peroxide takes place in the absence of a catalyst. However, a catalyst such as ammonium molybdate can be used if desired.

The 1,2-dihalovinylenedisulfides used as starting materials for the process of this invention can be made by reacting a tetrahaloethylene with a mercaptide, or with a mercaptan in the presence of an alkali metal hydroxide. In this process tetrahaloethylenes with a chlorine or bromine atom on each carbon are the more reactive. This method is particularly well adapted for the preparation of 1,2-dichloro and 1,2-difluoro compounds. For example, 1,2-bis(ethylmercapto)-1,2-dichloroethylene can be prepared by heating at reflux temperature an alcoholic solution of ethyl mercaptan, potassium hydroxide and tetrachloroethylene.

An alternative route to the dihalovinylenedisulfides which is particularly useful in preparing the bromo and iodo compounds involves the following reactions. A mercaptan and a 1,2-dihaloethylene such as 1,2-dichloroethylene are reacted in the presence of an alkali to form a vinylenedisulfide which is then brominated to the 1,2-dibromoethylenedisulfide. This dibromo compound is then dehydrohalogenated with alcoholic potassium hydroxide to the corresponding acetylenic disulfide which can then be brominated or iodinated to the corresponding 1,2-dibromo- or 1,2-diiodovinylenedisulfides. An alternate method for the formation of the acetylenic disulfides involves the dehalogenation of a 1,2-dihalovinylenedisulfide with a metal such as zinc.

Dihalovinylenedisulfoxides and -disulfones having different halogens on the two vinylene carbon atoms can be prepared from the disulfides derived from halogenated ethylenes having different halogens, e.g., from monofluorotrichloroethylene, or by oxidation of disulfides made by addition of mixed halogens such as iodine monochloride to acetylenic disulfides. Products having different terminal radicals attached to the sulfone or sulfoxide groups are made from the corresponding disulfides which can be made by first reacting one equivalent of a mercaptide with the tetrahaloethylene to form a monosulfide, and this monosulfide reacted with a second equivalent of a different mercaptide to form the desired dihalovinylenedisulfide, which can then be oxidized to the disulfoxide or disulfone in the customary manner.

In the fungicidal compositions and methods of my invention, I employ as an active ingredient a compound of Formula 1 shown above. It will be understood that the compounds represented by Formula 1 may exist as cis and trans isomers. Either isomer, or mixtures of both, can be used as the active ingredient, since the isomers possess substantially equal fungicidal activity. In practice, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of living plants such as vegetables, ornamental plants and fruit-bearing trees. The compositions are also highly effective when applied directly to the soil for controlling pathogenic fungi. Also they can be used to treat organic fibers and fabrics and various cellulosic materials such as wood and leather. Likewise they can be used to treat paints and lubricating oils. They also are of value as seed-treating agents.

In the application to plants, fungicidal control is obtained in most instances by applying the active compound at a dosage or rate of from about 0.5 to 10.0 lbs. per acre. The optimum amount within this range is largely dependent upon the variables discussed herein.

For the application directly to soil for use as a fungicide, in most instances, the dosage or rate is from about 1 to 75 lbs. per acre. The optimum dosage can be determined in each instance by one of the means conventional in the art. It is, of course, determined by and dependent upon the particular fungicidal compounds selected, the method of application, and, in the case of application to vegetation, the state and condition of the growth of the vegetation to be treated, and the climatic conditions.

The fungicidal compositions of the present invention contain in sufficient amount to exert fungicidal action one or more of the above-described active compounds in admixture with a carrier material or conditioning agent of the kind used and commonly referred to in the art as a fungicide adjuvant or a modifier. The conventional fungicide adjuvants are inert solids, liquid diluents, and surface-active agents. They provide formulations adapted for ready and efficient application using conventional applicator equipment. Usually from about 1 to 95% by weight of the fungicidal composition is active ingredient.

Solid compositions are preferably in the form of powders. They are compounded to the homogenous powders that either can be used as such, diluted with inert solids to form dusts, or suspended in a suitable liquid medium for spray application. The powders usually comprise active ingredient admixed with minor amounts of a conditioning agent.

Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in powder fungicidal compositions can be used. The active ingredient usually makes up from about 25 to 90% of these powder compositions. For conversion of the powders to dusts, talc, pyrophyllite, tobacco dust, volcanic ash and other dense rapid-settling inert solids customarily are used.

Liquid compositions employing one or more of the fungicidally active ingredients are prepared by admixing the active ingredients with a suitable liquid diluent medium. The active ingredients can be either in solution or in suspension in the liquid medium. Typical of the liquid media commonly employed as fungicidal adjuvant are kerosene, Stoddard solvent, xylene, alcohols, ketones, halogenated hydrocarbons, water, alkylated naphthalenes and glycols. The active ingredient usually makes up from about 0.5 to 60% of these liquid compositions. Some of these compositions are designed to be used as such, and others to be extended with large quantities of water.

Compositions in the form of wettable powders or liquids in many cases also include one or more surface active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

The following examples in which parts are by weight are illustrative of the invention and are given in addition to those already set forth above.

*Example I*

A solution of 100 parts of ethyl mercaptan (1.6 moles) and 110 parts of 85% potassium hydroxide (1.67 moles) in 237 parts of denatured alcohol is heated to boiling in a reaction vessel fitted with a reflux condenser. To the refluxing solution is added dropwise 134 parts (0.8 mole) of tetrachloroethylene. The mixture is refluxed for two hours, during which potassium chloride separates. The mixture is then poured into 1500 parts of water and the product is collected by extraction with benzene. The benzene is removed under reduced pressure and the product is distilled under reduced pressure. There is obtained 104 parts (corresponding to a yield of 60% of theory) of 1,2-bis(ethylmercapto)-1,2-dichloroethylene boiling at 110–114° C./5 mm. and having a refractive index, $n_D^{25}$, of 1.5749.

*Analysis.*—Calculated for $C_6H_{10}Cl_2S_2$: Cl, 32.6%; S, 29.5%. Found: Cl, 32.2, 32.1%; S, 30.7, 30.6%.

To 44 parts (0.2 mole) of 1,2-bis(ethylmercapto)-1,2-dichloroethylene in 315 parts of acetic acid is added slowly 135 parts (1.2 moles) of 30% aqueous hydrogen peroxide and the solution is heated on a steam bath for 15 hours. It is then evaporated under reduced pressure and the residue is stirred with a little water, filtered and rinsed with methanol. The crystals are recrystallized from methanol and there is obtained 24.5 parts of product. The methanol mother liquor and the original methanol washings are evaporated and the syrup obtained is dissolved in 307 parts of acetic acid and heated with an additional 60 parts (0.53 mole) of hydrogen peroxide. The resulting product is isolated and purified as above and there is obtained an additional 11 parts. The total yield of 1,2-bis(ethylsulfonyl)-1,2-dichloroethylene is 35.5 parts corresponding to a yield of 62% of the theory. The product melts at 108–110° C.

*Analysis.*—Calculated for $C_6H_{10}Cl_2O_4S_2$: Cl, 25.2%. Found: Cl, 25.3, 25.3%.

The 1,2-bis(ethylsulfonyl)-1,2-dichloroethylene of this example is a good seed protectant. It is effective in protecting acid-delinted cotton seeds from attack by soil microorganisms and is particularly effective as a corn seed protectant.

*Example II*

1,2-bis(ethylmercapto)-1,2-difluoroethylene is prepared in a manner similar to that used for the preparation of the dichloro compound in Example I from ethyl mercaptan, potassium hydroxide, and 1,2-dichloro-1,2-difluoroethylene. The product has a boiling point of 60–66° C./5 mm. and a refractive index $n_D^{25}$, of 1.4968.

*Analysis.*—Calculated for $C_6H_{10}F_2S_2$: S, 34.80%. Found: S, 35.42, 35.80%.

A solution of 15 parts (0.08 mole) of 1,2-bis(ethylmercapto)-1,2-difluoroethylene in 105 parts of acetic acid is placed in a reaction vessel fitted with a reflux condenser and 45 parts (0.5 mole) of 30% aqueous hydrogen peroxide is added gradually. After about one-fourth of the hydrogen peroxide is added, the addition is stopped for 15 minutes until the exothermic reaction subsides. The remainder of the hydrogen peroxide is then added slowly and the mixture is heated on a steam bath for 16 hours. The acetic acid is evaporated off and the solid reaction product is washed with water. On recrystallization from ethanol there is obtained 7.6 parts, corresponding to a yield of 37% of the theory, of 1,2-bis(ethylsulfonyl)-1,2-difluoroethylene melting at 118–119° C.

*Analysis.*—Calculated for $C_6H_{10}F_2O_4S_2$: S, 25.83%. Found: S, 25.96, 26.10%.

1,2-bis(ethylsulfonyl)-1,2-difluoroethylene is especially effective as a protectant for cucumber seeds.

*Example III*

1,2-bis(dodecylmercapto)-1,2-dichloroethylene is prepared by the general method of Example I from n-dodecyl mercaptan, potassium hydroxide and tetrachloroethylene. This 1,2-dichlorovinylenedisulfide melts at 38–39° C. after recrystallization from ethanol.

*Analysis.*—Calculated for $C_{26}H_{50}Cl_2S_2$: Cl, 14.25%. Found: Cl, 14.58, 14.75%.

A solution of 49.7 parts of 1,2-bis(dodecylmercapto)-1,2-dichloroethylene (0.1 mole) in 315 parts of acetic acid is placed in a reaction vessel fitted with a reflux condenser and 70 parts of 30% aqueous hydrogen peroxide (0.6 mole) is added. The mixture is heated on a steam bath for 16 hours during which crystals form.

The reaction mixture is cooled in ice and 48 parts of crystalline product isolated by filtration. On recrystallization from a mixture of benzene and hexane there is obtained 42.5 parts, corresponding to a 76% yield, of 1,2-bis(dodecylsulfonyl)-1,2-dichloroethylene melting at 107–108° C.

*Analysis.*—Calculated for $C_{26}H_{50}Cl_2O_4S_2$: Cl, 12.62%. Found: Cl, 12.85, 12.88%.

The preceding preparative examples have illustrated the active fungicidal ingredients of this invention with certain specific compounds. However, the invention is generic to all 1,2-dihalovinylenedisulfoxides and -disulfones, including both the cis and trans geometric isomers. As indicated previously, the halogens attached to the two carbons of the vinylene group can be either the same or different, and can be fluorine, chlorine, bromine or iodine.

As already pointed out, the monovalent terminal radicals attached to the sulfonyl or sulfoxide groups can be either the same or different alkyl radicals. Specific examples of other 1,2-dihalovinylenedisulfoxides and -disulfones of the present invention include:

1,2-bis(methylsulfonyl)-1,2-dichloroethylene
1,2-bis(methylsulfonyl)-1,2-dibromoethylene
1,2-bis(methylsulfinyl)-1,2-dichloroethylene
1,2-bis(ethylsulfinyl)-1,2-dichloroethylene
1,2-bis(ethylsulfonyl)-1,2-dibromoethylene
1,2-bis(n-propylsulfonyl)-1,2-dichloroethylene
1,2-bis(n-propylsulfinyl)-1,2-dichloroethylene
1,2-bis(isopropylsulfonyl)-1,2-dichloroethylene
1,2-bis(isopropylsulfonyl)-1,2-dibromoethylene
1,2-bis(isobutylsulfonyl)-1,2-dichloroethylene
1,2-bis(n-hexylsulfinyl)-1,2-dichloroethylene
1-(methylsulfonyl)-2-(ethylsulfonyl)-1,2-dichloroethylene
1,2-bis(ethylsulfonyl)-1-chloro-2-fluoroethylene
1,2-bis(ethylsulfonyl)-1,2-diiodoethylene
1-(ethylsulfinyl)-2-(ethylsulfonyl)-1,2-dichloroethylene 1,2-bis(ethylsulfonyl)-1,2-dichloroethylene is an especially active seed protectant and is an especially preferred species of this invention. It is effective as a seed protectant at very low rates on corn, sorghum, peas, cantaloupe, and acid-delinted cotton seeds. It is also effective as a protectant on cucumbers, lima beans, wheat and oats. 1,2-bis(ethylsulfonyl)-1,2-dichloroethylene, trans isomer, has been found to be much better than the recognized standard treatment for corn (thiram) even though used at a much lower dosage.

1,2-bis(methylsulfinyl)-1,2-dichloroethylene is especially effective as a protectant for cucumber seed and corn.

In the 1,2-bis(alkylsulfonyl)-1,2-dichloroethylenes the n-propyl derivative is effective as a protectant for cucumber, corn, sorghum and lima beans. The isopropyl derivative is effective for sorghum, cucumber, cotton and corn, and the isobutyl derivative is especially effective for cucumber seeds.

1,2-bis(isopropylsulfonyl)- and 1,2-bis(isobutylsulfonyl)-1,2-dichloroethylene are also quite effective as fungicides. For example, aqueous suspensions containing 0.2% of these two 1,2-dichlorovinylenedisulfones and a wetting agent are quite effective in preventing disease of tomato leaves inoculated with early blight (*Alternaria solani*). These disulfones are almost as effective at concentrations as low as 0.04%. In contrast, the same concentrations of 1,2-bis(isopropylmercapto)-1,2-dichloroethylene allowed 62% to 100% disease of tomato leaves inoculated with the same fungus.

Further examples illustrating the fungicidal effectiveness of the compounds of the present invention follow.

*Example IV*

1,2-bis-(ethylsulfonyl)-1,2-dichloroethylene of Example I is formulated into a fungicidal composition having the following ingredients:

25% 1,2-bis-(ethylsulfonyl)-1,2-dichloroethylene
75% attapulgite

The components are blended together and then ground in a hammer mill to give particles with an average particle size of 50 microns or less.

This dust formulation is drilled into soil known to be infested with cotton sore shin (*Rhizoctonia solani*) at a rate of 50 lbs. active material per acre. After 4 days, cotton seeds are planted, and the plants that develop are not infected with the fungus.

*Example V*

*Part A.*—1,2-bis-(ethylsulfonyl)-1,2-dichloroethylene of Example I is formulated into a fungicidal composition of the following ingredients:

40% 1,2-bis-(ethylsulfonyl)-1,2-dichloroethylene
0.75% alkylnaphthalenesulfonic acid sodium salt
0.25% low viscosity methyl cellulose
59% synthetic fine silica The components are blended together and passed twice through a micropulverizer. The average particle size of the resulting powder is less than 50 microns.

The above wettable powder formulation is slurried with water at a ratio of 0.5 lb. of formulation per gallon of water and applied to seed corn at the rate of 0.5 oz. of active material per 100 lbs. of seed. The treated seeds and untreated seeds as a control are planted and, after allowing sufficient time for the seeds to germinate, it is found that many more treated seeds germinate than do untreated seeds.

*Part B.*—Trans 1,2-bis(ethylsulfonyl)-1,2-dichloroethylene and thiram are prepared as 25% active dusts on a silica aerogel powder ("Santocel" C, Monsanto Chemical Co.) by ball milling. Hybrid corn seeds are then treated with known amounts of the dust to give 4 different rates of active ingredient on the seed. Three 40-seed replicates are planted in field soil and then incubated for 6 days at 50° F. The percent stand is given in the following table:

| | Oz. Active/100 Wt. of Seed | | | |
|---|---|---|---|---|
| | 0.125 | 0.25 | 0.5 | 0.75 |
| trans 1,2-bis(ethylsulfonyl),1,2-dichloroethylene | 93 | 97 | 97 | 97 |
| thiram | 65 | 75 | 83 | 85 |
| untreated check | ------ | 40 | | ------ |

*Example VI*

1,2-bis-(n-propylsulfonyl)-1,2-dichloroethylene is formulated into a fungicidal composition containing the following ingredients:

25% 1,2-bis(n-propylsulfonyl)-1,2-dichloroethylene
40% attapulgite
35% kaolin clay The above ingredients are blended together and then ground in a hammer mill to give particles with an average particle size of 50 microns or less.

The resulting dust formulation is added to seed corn at the rate of ¼ oz. of active material per 100 lbs. of seed and the mixture tumbled for homogeneous mixing. The treated seeds, along with untreated seeds as a control, are planted. After allowing sufficient time for the seeds to germinate, it is observed that many more treated seeds germinate than do untreated seeds.

*Example VII*

1,2-bis-(methylsulfonyl)-1,2-dichloroethylene is formulated into a fungicidal composition of the following ingredients:

75% 1,2-bis-(methylsulfonyl)-1,2-dichloroethylene 0.75% alkylnaphthalenesulfonic acid sodium salt
0.25% low-viscosity methyl cellulose
24% attapulgite The above listed components are blended together and passed twice through a micropulverizer.

This wettable powder formulation, when diluted with water and sprayed on apple trees to runoff at the rate of 4 lbs. of active material per 100 gallons of water is effective in preventing apple scab (*Venturia inaequalis*).

*Example VIII*

1,2-bis-(isopropylsulfonyl)-1,2-dichloroethylene is formulated into a fungicidal composition having the following ingredients:

20% 1,2-bis-(isopropylsulfonyl) 1,2-dichloroethylene
80% pyrophyllite

The components are blended together and passed through a micropulverizer.

This dust formulation when applied to tomato plants at the rate of 4 lbs. of active material per acre is effective in controlling tomato early blight (*Alternaria solani*).

*Example IX*

1,2-bis(n-propylsulfonyl)-1,2-dichloroethylene is formulated into a fungicidal composition of the following ingredients:

30% 1,2-bis(n-propylsulfonyl)-1,2-dichloroethylene
0.75% alkylnaphthalenesulfonic acid sodium salt
0.25% low-viscosity methyl cellulose
69% diatomaceous earth The components are blended together and passed twice through a micropulverizer.

The resulting wettable powder formulation, when diluted with water at the rate of 4 lbs. of active material per 100 gallons of water and this suspension applied to tomato plants at the rate of 100 gallons per acre is effective in preventing tomato early blight (*Alternaria solani*). When diluted with water, applied to infested soil at rate of 35 lbs. per acre and mixed into the soil, the composition will effectively prevent the sore shin disease of cotton (*Rhizoctonia solani*) from attacking cotton seedlings.

*Example X*

1,2-bis(isopropylsulfonyl)-1,2-dichloroethylene is formulated into a fungicidal composition of the following ingredients:

10% 1,2-bis(isopropylsulfonyl)-1,2-dichloroethylene
90% ethylene dichloride

The compound is dissolved in the organic solvent and the solution mixed until homogeneous. The resulting oil solution when sprayed on lumber is effective in controlling the fungi that attack wood.

*Example XI*

1,2-bis-(ethylsulfonyl)-1,2-dichloroethylene is the active component of a fungicidal composition having the following ingredients:

10% 1,2-bis-(ethylsulfonyl)-1,2-dichloroethylene of Example I
85% ethylene dichloride
5% alkyl aryl polyether alcohol The compound is dissolved in the solvent. Then the emulsifier is blended in this solution.

The emulsifiable oil formulation is mixed with water at the rate of 1 gallon per 10 gallons of water. This aqueous emulsion is then sprayed into furrows in soil which is known to be infested with Pythium sp., a fungus that causes damping-off of beans, at the rate of 60 lbs. of active material per acre. After a period of 5 days, beans are planted in the sprayed soil. The plants that develop are not infected by the fungus.

*Example XII*

The following components are blended together and then ground in a hammer mill to give particles with an average particle size of 50 microns or less:

25% 1,2-bis-(methylsulfinyl)-1,2-dichloroethylene
40% attapulgite
35% kaolin clay The resulting dust formulation is tumbled with cotton seeds, using 2 oz. of active material per 100 lbs. of seeds. The treated seeds, along with untreated seeds as a control, are planted and, after allowing sufficient time for the seeds to germinate, it is found that many more treated seeds germinate than do untreated seeds.

*Example XIII*

1,2-bis-(n-dodecylsulfonyl)-1,2-dichloroethylene of Example III is formulated into a fungicidal composition of the following ingredients:

25% 1,2-bis-(n-dodecylsulfonyl)-1,2-dichloroethylene
75% attapulgite

The components are blended together and then ground in a hammer mill to give particles with an average particle size of 50 microns or less.

This dust formulation when applied to bean plants at the rate of 80 lbs. of active material per acre, is effective in preventing bean rust (*Uromyces appendiculatus*).

*Example XIV*

1,2-bis-(ethylsulfonyl)-1,2-difluoroethylene of Example II is dissolved in acetone to give a 2% solution. This acetone solution is used as a dip. Cotton fabric is dipped therein until it picks up 100% of its weight of the solution. By so treating the fabric, the growth of fungus on the fabric is prevented.

*Example XV*

A fungicidal composition containing 25% 1,2-bis-(methylsulfinyl)-1,2-dibromoethylene and 75% ground phosphate rock is prepared by blending the components together and passing the blend through a micropulverizer.

The resulting dust formulation when applied to apple trees at the rate of 10–15 lbs. of active material per acre is effective in preventing apple scab (*Venturia inaequalis*).

*Example XVI*

A dust formulation containing 30% 1,2-bis-(methylsulfinyl)-1,2-dichloroethylene and 70% stearated calcium carbonate is tumbled with cucumber seed at the rate of 2–3 oz. of active material per 100 lbs. of seed. The treated seeds, along with untreated seeds as a control, are planted. After allowing sufficient time for the seeds to germinate, it is found that far more treated seeds germinate than do untreated seeds.

*Example XVII*

1,2-bis-(n-propylsulfinyl)-1,2-dichloroethylene is formulated into a fungicidal composition having the following ingredients:

10% cis 1,2-bis-(n-propylsulfinyl)-1,2-dichloroethylene
85% ethylene dichloride
5% alkyl aryl polyether alcohol The active compound is dissolved in the solvent then the emulsifier, the alkyl aryl polyether alcohol, is blended into the ethylene chloride solution.

This emulsifiable oil formulation is mixed with water at the rate of 1 gallon per 10 gallons of water. This aqueous emulsion is then drilled into soil, which is known to be infested with cotton sore shin (*Rhizoctonia solani*), at the rate of 75 lbs. of active material per acre. After 5 days, cotton seeds are planted, and the plants that developed are not afflicted with sore shin.

*Example XVIII*

The fungicidal composition of this example contains the following:

20% trans 1,2-bis-(isobutylsulfonyl)-1,2-dichloroethylene
0.25% sodium lauryl sulfate
0.50% sodium lignin sulfonate
79.25% kaolin clay The above components are blended together and passed twice through a micropulverizer.

The resulting wettable powder when diluted with water and applied to tomato plants at the rate of 2–3 lbs. of active material per 100 gallons per acre is effective in preventing tomato late blight (*Phytophthora infestans*).

*Example XIX*

This example illustrates an aqueous suspension formulation of the invention and contains the following:

40% 1,2-bis(ethylsulfonyl)1,2-dichloroethylene
0.75% polyvinyl alcohol
0.25% carboxylated polyacrylic acid (available under the trade name of Carbopol from B. F. Goodrich Co. or Acrysol from Rohm and Haas)
59% water The ingredients are blended and are wet ground to an average particle size less than 10 microns. The resulting thixotropic aqueous suspension is diluted with water and applied in conventional seed treating equipment. It gives excellent protectant action on corn at the rate of 0.25 oz. active per bushel.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A compound of the formula $$RSO_m\underset{X}{\underset{|}{C}}{=}\underset{Y}{\underset{|}{C}}{-}SO_nR'$$

wherein the indicated oxygen atoms are attached only to the indicated sulfur atoms which sulfur atoms otherwise are attached only to carbon, R and R' are each an alkyl radical having from 1 to 12 carbon atoms, *m* and *n* are each an integer up to 2, and X and Y are each a halogen.

2. A 1,2-bis(alkylsulfoxy)-1,2-dichloroethylene wherein each sulfoxy group has two valences of the sulfur atom attached to carbon and the sulfur atom has no more than two oxygens attached to sulfur and each oxygen atom attached to the sulfur has all its valences bonded to said sulfur, and wherein said alkyl has from 1 to 12 carbon atoms.

3. A 1,2-bis(alkylsulfonyl)-1,2-dichloroethylene wherein said alkyl has from 1 to 12 carbon atoms.

4. 1,2-bis(methylsulfonyl)-1,2-dichloroethylene.

5. 1,2-bis(ethylsulfonyl)-1,2-dichloroethylene.

6. 1,2-bis(methylsulfinyl)-1,2-dichloroethylene.

7. 1,2-bis(isopropylsulfonyl)-1,2-dichloroethylene.

8. 1,2-bis(isobutylsulfonyl)-1,2-dichloroethylene.

9. A method for the prevention of destruction of plants by fungi comprising applying to the locus to be protected, in an amount sufficient to exert a fungicidal action, a compound of the formula $$R{-}SO_m{-}\underset{X}{\underset{|}{C}}{=}\underset{Y}{\underset{|}{C}}{-}SO_n{-}R'$$

wherein R and R' are alkyl radicals having from 1 to 12 carbon atoms, *m* and *n* are positive whole numbers not greater than 2, and X and Y are each a halogen.

10. A fungicidal composition comprising a carrier and, in a fungicidally effective amount, a compound of the formula $$R{-}SO_m{-}\underset{X}{\underset{|}{C}}{=}\underset{Y}{\underset{|}{C}}{-}SO_n{-}R'$$

wherein R and R' are alkyl radicals having from 1 to 12 carbon atoms, *m* and *n* are positive whole numbers not greater than 2, and X and Y are each a halogen.

11. A fungicidal composition according to claim 10 containing an inert solid as a carrier.

12. A fungicidal composition according to claim 10 wherein R and R' are lower alkyl, *m* and *n* are both 2, and X and Y are chlorine.

13. A fungicidal composition comprising a surface-active-dispersing agent and, in a fungicidally effective amount a compound of the formula $$R{-}SO_m{-}\underset{X}{\underset{|}{C}}{=}\underset{Y}{\underset{|}{C}}{-}SO_n{-}R'$$

wherein R and R' are alkyl radicals having from 1 to 12 carbon atoms, *m* and *n* are positive whole numbers not greater than 2, and X and Y are each a halogen.

14. A method of controlling soil borne fungi which comprises applying to soil, in an amount sufficient to exert fungicidal action, a compound of the formula $$R{-}SO_m{-}\underset{X}{\underset{|}{C}}{=}\underset{Y}{\underset{|}{C}}{-}SO_nR'$$

wherein R and R' are alkyl radicals having from 1 to 12 carbon atoms, *m* and *n* are positive whole numbers not greater than 2 and X and Y are each a halogen.

References Cited in the file of this patent

UNITED STATES PATENTS

| | | |
|---|---|---|
| 2,493,364 | Schoene | Jan. 3, 1950 |
| 2,583,425 | Hawley | Jan. 22, 1952 |
| 2,634,202 | Fincke | Apr. 7, 1953 |
| 2,793,234 | Metivier | May 21, 1957 |

OTHER REFERENCES

J. Econ. Ent., vol. 40, No. 5 (1947), pp. 736–741, p. 740 pert.

Chem. Soc. Jour., pt. I, pp. 767–770 (p. 769 relied upon), January-June 1937.

Schneider: Berichte, vol. 84, No. 10, pp. 911–916, (p. 916 pert.), 1951.

Horsfall: Fungicides and Their Actions, vol. 2, p. 151, 1945.